US012753289B2

(12) United States Patent
Ishikawa et al.

(10) Patent No.: US 12,753,289 B2
(45) Date of Patent: Oct. 6, 2026

(54) EVOH EXTRACTANT, EVOH EXTRACTION METHOD USING THE SAME, EVOH RECOVERY METHOD, AND EVOH EXTRACTANT REGENERATION METHOD

(71) Applicant: KYOEISHA CHEMICAL CO., LTD., Osaka (JP)

(72) Inventors: Makoto Ishikawa, Nara (JP); Yoshihisa Katsunishi, Nara (JP); Masashi Kinugawa, Nara (JP)

(73) Assignee: KYOEISHA CHEMICAL CO., LTD., Osaka (JP)

( * ) Notice: Subject to any disclaimer, the term of this patent is extended or adjusted under 35 U.S.C. 154(b) by 647 days.

(21) Appl. No.: 18/260,815

(22) PCT Filed: Jan. 5, 2022

(86) PCT No.: PCT/JP2022/000107
§ 371 (c)(1),
(2) Date: Jul. 10, 2023

(87) PCT Pub. No.: WO2022/158287
PCT Pub. Date: Jul. 28, 2022

(65) Prior Publication Data

US 2024/0052128 A1 Feb. 15, 2024

(30) Foreign Application Priority Data

Jan. 22, 2021 (WO) .................. PCT/JP2021/002239

(51) Int. Cl.
*C08J 11/08* (2006.01)

(52) U.S. Cl.
CPC ............ *C08J 11/08* (2013.01); *C08J 2329/04* (2013.01)

(58) Field of Classification Search
USPC ........................................................ 260/40
See application file for complete search history.

(56) References Cited

U.S. PATENT DOCUMENTS 4,547,329 A 10/1985 Dombroski et al.
5,278,282 A 1/1994 Nauman
2006/0223896 A1* 10/2006 Lepers ...................... C08J 3/14 521/46.5
2008/0176989 A1 7/2008 Sugihara et al.
2019/0193303 A1 6/2019 Heyde et al.

FOREIGN PATENT DOCUMENTS

JP 56-61430 A 5/1981
JP 2010084037 A 4/2010
JP 2014-218642 A 11/2014
WO WO-2008125465 A1 * 10/2008 ............. C08J 11/18

OTHER PUBLICATIONS

Extended European Search Report dated Mar. 4, 2025 for application EP 22742412.4.
Batista Rosa M F et al: "Novel optical chemosensors for anions and cations based on an amino acid core functionalised with benzimidazoles", Tetrahedron, vol. 68, No. 36, Jun. 28, 2012 (Jun. 28, 2012), pp. 7322-7330.
Wu Tong et al: "Mononuclear and Dinuclear Copper Complexes of Tridentate C08J Redox-active Ligands with Tunable H-bonding Donors: Structure, Spectroscopy and H + /e-Reactivity", Chemistry—An Asian Journal, [Online] vol. 16, No. 12, May 13, 2021 (May 13, 2021), pp. 1608-1618.
International Search Report, dated Mar. 22, 2022, corresponding to International Application No. PCT/JP2022/000107.

* cited by examiner

*Primary Examiner* — Terressa Boykin
(74) *Attorney, Agent, or Firm* — Ladas & Parry LLP; Malcolm J. MacDonald, Esq.

(57) ABSTRACT

Provided is an EVOH extractant capable of efficiently extracting EVOH from an EVOH layer-containing multilayer resin molded body. Provided is a method for efficiently extracting and recovering EVOH from an EVOH layer-containing multilayer resin molded body. An EVOH extractant including a polar solvent having an SP value of 9 to 13 and a quaternary ammonium salt. An EVOH extraction method for extracting EVOH, including applying the EVOH extractant described above to an EVOH layer-containing multilayer resin molded body. An EVOH recovery method including a step of mixing a solution containing EVOH that has been extracted by the EVOH extraction method described above with water and/or a lower alcohol to deposit EVOH, followed by filtration or centrifugation.

5 Claims, No Drawings

EVOH EXTRACTANT, EVOH EXTRACTION METHOD USING THE SAME, EVOH RECOVERY METHOD, AND EVOH EXTRACTANT REGENERATION METHOD

TECHNICAL FIELD

The present invention relates to an EVOH extractant, an EVOH extraction method using the same, an EVOH recovery method, and an EVOH extractant regeneration method.

BACKGROUND ART

In order to meet the performance requirements of gas barrier materials such as packaging materials, a large number of multilayer films formed by combining different kinds of materials have been put on the market. However, because films with different properties are laminated, these materials are difficult to separate, and this makes it difficult to perform material recycling for the protection of the global environment, etc. EVOH (ethylene-vinyl alcohol copolymer), which is excellent in film-forming properties, transparency, flexibility, and the like, is often used as a gas barrier film in such a multilayer film. However, in most cases, EVOH is sandwiched between layers of the film, making its recovery even more difficult.

In the past, as a method for recovering a vinyl alcohol polymer, a method in which EVOH dissolved in a water/ethanol mixture is converted into a gel, and the gel is crushed to form polymer particles suspended in a liquid, has been proposed (PTL 1). However, with a water/ethanol mixture, it is difficult to sufficiently dissolve EVOH existing between layers of a multilayer film.

In addition, as a method for producing a recycled raw material from a polyvinyl alcohol-based resin molded body containing an inorganic filler, a method in which a polyvinyl alcohol-based resin containing an inorganic filler is dissolved in water, and then the polyvinyl alcohol-based resin containing an inorganic filler is deposited using an alcohol having 3 to 6 carbon atoms, has been proposed (PTL 2). However, because EVOH is not soluble in water, this method is not applicable.

In addition, it has been proposed that in a method for generating a polyolefin renewable material, as a result of an alkaline treatment using an aqueous alkali metal hydroxide solution, an EVOH-based polymer coating can be removed (PTL 3). However, EVOH does not dissolve in an inorganic alkaline aqueous solution, and, in addition, there is no disclosure of isolating and recovering EVOH.

CITATION LIST

Patent Literature

PTL 1: JP2006-520415A
PTL 2: JP2014-218642A
PTL 3: JP2019-529191A

SUMMARY OF INVENTION

Technical Problem

An object of the invention is to provide an EVOH extractant capable of efficiently extracting EVOH from an EVOH layer-containing multilayer resin molded body.

Another object of the invention is to provide a method for extracting, as well as a method for recovering, EVOH efficiently from an EVOH layer-containing multilayer resin molded body.

Another object of the invention is to provide a method for regenerating the EVOH extractant of the invention after the extraction of EVOH.

Solution to Problems

The invention is an EVOH extractant including a polar solvent having an SP value of 9 to 13 and a quaternary ammonium salt.

It is preferable that the polar solvent is at least one member selected from the group consisting of ethylene glycol monobutyl ether, N-methyl-2-pyrrolidone (NMP), isopropanol, dimethyl formamide (DMF), dimethyl sulfoxide (DMSO), and phenyl glycol.

It is preferable that a 1 mass % aqueous solution of the quaternary ammonium salt has a pH of 11.5 or more.

In addition, the invention is also an EVOH extraction method for extracting EVOH, including applying the EVOH extractant described above to an EVOH layer-containing multilayer resin molded body.

It is preferable that the EVOH extraction method described above includes a step of immersing the EVOH layer-containing multilayer resin molded body in a solution of the EVOH extractant to extract EVOH.

In addition, the invention is also an EVOH recovery method including a step of mixing a solution containing EVOH that has been extracted by the EVOH extraction method described above with water and/or a lower alcohol to deposit EVOH, followed by filtration or centrifugation.

Further, the invention is also an EVOH extractant regeneration method including a step of removing water and/or a lower alcohol by distillation from a liquid left after the recovery of EVOH by the EVOH recovery method described above.

It is preferable that the method includes a step of adding a polar solvent and/or water to a residue obtained in the above step.

Advantageous Effects of Invention

The EVOH extractant of the invention enables the extraction of EVOH from an EVOH layer-containing multilayer resin molded body by specifically dissolving the EVOH.

In addition, the invention makes it possible to efficiently recover EVOH.

In addition, the invention makes it possible to efficiently regenerate an EVOH extractant after the extraction of EVOH.

DESCRIPTION OF EMBODIMENTS

The EVOH extractant of the invention includes a polar solvent having an SP value of 9 to 13 and a quaternary ammonium salt.

In the invention, a polar solvent having a specific SP value and a quaternary ammonium salt, which is an organic alkaline compound, are combined to give an EVOH extractant. As a result, EVOH existing between layers of a multilayer resin molded body can be sufficiently extracted, and, in addition, EVOH can subsequently be recovered in a simple manner.

As a result of using a polar solvent having a specific SP value, EVOH can be dissolved, and further the dissolution of EVOH existing between layers of a multilayer resin molded body is promoted. In addition, as a result of using a quaternary ammonium salt, the dissolution of EVOH can be promoted, and particularly in the case where other substances are contained in the multilayer resin molded body, their removal is possible, allowing for efficient extraction of EVOH. In addition, as a result of using them together, the penetration of the EVOH extractant between layers of the multilayer resin molded body is improved, allowing for sufficient dissolution of EVOH existing between layers.

It is necessary that the polar solvent used in the invention has an SP value of 9 to 13.

The SP value (solubility parameter (δ)) is a value defined by the regular solution theory introduced by Hildebrand, and is calculated from the square root of the heat of vaporization required to evaporate 1 $cm^3$ of a liquid $(cal/cm^3)^{1/2}$.

In the invention, use of a polar solvent having an SP value within this range helps the organic alkaline compound in the EVOH extractant to act on EVOH existing between layers of a multilayer resin molded body, allowing for sufficient dissolution of EVOH.

In the invention, the SP value of the polar solvent used is preferably 10 or more. Meanwhile, the SP value is preferably 12 or less.

As polar solvents having the above SP value, specifically, diethylene glycol monobutyl ether (SP value: 9.0), N-methyl-2-pyrrolidone (NMP) (SP value: 11.2), isopropanol (SP value: 11.5), dimethyl formamide (DMF) (SP value: 11.9), dimethyl sulfoxide ((DMSO) SP value: 12.0), benzyl alcohol (SP value: 10.8), phenyl glycol (SP value: 12.4), and the like can be mentioned. They may be used alone, and it is also possible to use two or more kinds together. Among them, NMP is preferable.

It is preferable that a 1 mass % aqueous solution of the quaternary ammonium salt used in the invention has a pH of 11.5 or more. When the pH is in this range, in the case where an adhesive is used in the EVOH layer-containing multilayer resin molded body, the adhesive can be dissolved, and, therefore, the extract comes into contact with EVOH more easily, leading to an advantage in that the dissolution of EVOH is accelerated.

As quaternary ammonium salts used in the invention, specifically, dimethyl bis(2-hydroxyethyl)ammonium hydroxide (the above pH: 12.3), monomethyl tris(2-hydroxyethyl)ammonium hydroxide (the above pH: 12.1), trimethyl-2-hydroxyethyl ammonium hydroxide (the above pH: 12.5), tetraalkyl ammonium hydroxides whose 1 mass % aqueous solutions have a pH of 11.5 or more (e.g., tetramethyl ammonium hydroxide (the above pH: 12.9)), and the like can be mentioned.

Among them, dimethyl bis(2-hydroxyethyl)ammonium hydroxide and the like are preferable.

It is preferable that the EVOH extractant of the invention is used in the form of an aqueous solution.

The water content in the EVOH extractant aqueous solution is preferably 5 mass % or more, and more preferably 10 mass % or more.

Meanwhile, the upper limit is preferably 40 mass %, and more preferably 30 mass %.

When the water content is within the above range, a uniform state can be maintained at the time of mixing as a solution, and also excellent EVOH solubility can be exhibited.

In the EVOH extractant aqueous solution, the polar solvent is preferably contained in an amount of 50 to 90 mass %. The lower limit of the content is more preferably 60 mass %, and still more preferably 65 mass %. Meanwhile, the upper limit of the content is more preferably 80 mass %, and still more preferably 75 mass %.

In the EVOH extractant aqueous solution, the quaternary ammonium salt is preferably contained in an amount of 1 to 20 mass %. The lower limit of the content is more preferably 3 mass %, and still more preferably 5 mass %. Meanwhile, the upper limit of the content is more preferably 18 mass %, and still more preferably 15 mass %.

In addition, the ratio between the polar solvent and the quaternary ammonium salt is preferably 20:1 to 5:1 (mass ratio).

Further, the EVOH extractant of the invention preferably contains a surfactant. The presence of a surfactant is advantageous in that in the case where other contaminants and the like are contained, residual contaminants in the multilayer resin molded body such as a film can be emulsified, allowing the contaminants to be removed from the extractant penetration interface.

As the surfactant, a nonionic surfactant is preferable. In particular, a nonionic surfactant having an HLB of 8 to 18 is preferable.

Incidentally, in the invention, HLB is a value defined by Griffin's method using the following formula.

$$HLB \text{ value}=20\times[\text{total chemical formula weight of hydrophilic moieties}]/\text{molecular weight}$$

As nonionic surfactants, ether types such as polyoxyethylene alkyl ethers and polyoxyethylene alkylphenyl ethers;

ester types such as glycerin fatty acid esters, sorbitan fatty acid esters, sucrose fatty acid esters, polyglycerin fatty acid esters, and propylene glycol fatty acid esters;

ester ether types such as polyoxyethylene glycerin fatty acid esters, polyoxyethylene castor oil, polyoxyethylene hydrogenated castor oil, polyoxyethylene sorbitan fatty acid esters, and sorbitan fatty acid ester polyethylene glycol; and the like can be mentioned.

Among them, polyoxyethylene alkyl ethers, polyoxypropylene alkyl ethers, and the like are preferable.

The above surfactants may be used alone, and it is also possible to use two or more kinds together.

In addition, the surfactant content is preferably 0.1 to 5 mass % in an aqueous solution of the EVOH extractant.

The multilayer resin molded body of interest in the invention is not particularly limited, and is a multilayer resin molded body that uses an EVOH layer between layers as a layer having a gas barrier function. For example, commonly used packaging materials such as films and sheets for packaging and packaging containers, fuel tanks for gasoline and the like, hoses for refrigerant transportation, optical materials, and the like can be mentioned.

Such a multilayer resin molded body is a laminate formed of a combination of two or more kinds of resin layers.

EVOH usually exists between layers of a laminate having a three-layer structure, for example, together with polyethylene, polypropylene, and like olefin-based resin layers, polyethylene terephthalate, polyethylene naphthalate, and like polyester resin layers, or polyamide-based resin layers.

In the case where the multilayer resin molded body is a multilayer film, a group of olefin-based films consisting of unstretched polyethylene (PE) resin films, unstretched polypropylene (CPP) resin films, cyclic polyolefin (COP or COC) resin films, and co-extruded films of unstretched polyethylene and unstretched polypropylene (PE/CPP), polyethylene terephthalate (PET) resin films, polyamide (PA) resin films, polyethylene naphthalate (PEN) resin films, polyacrylonitrile (PAN) resin films, polycarbonate (PC)

resin films, polyimide (PI) resin films, polyvinyl chloride (PVC) resin films, and the like are used. In the invention, any of them may be used.

In addition, the multilayer resin molded body may be formed by bonding layers using an adhesive. As adhesives, commonly used polyurethane adhesive compositions and the like can be mentioned. These adhesives are dissolved by the quaternary ammonium salt in the EVOH extractant of the invention. Therefore, the extraction of EVOH existing between layers of the multilayer resin molded body can be performed more satisfactorily.

EVOH is a resin usually obtained by copolymerizing ethylene and a vinyl ester monomer and then saponifying the copolymer, and vinyl acetate is commonly used. Also as the polymerization method, any known polymerization method such as solution polymerization, suspension polymerization, emulsion polymerization, or the like can be used, and solution polymerization using methanol as a solvent is commonly used. The saponification of the obtained ethylene-vinyl ester copolymer can also be performed by a known method. Such EVOH is mainly composed of an ethylene structural unit and a vinyl alcohol structural unit, and also contains some unsaponified, residual vinyl ester structural unit.

The invention can act particularly well on EVOH whose ethylene unit content is preferably 3 to 70 mol %, and more preferably 25 to 50 mol %.

The ethylene unit content can be determined, for example, from $^{1}$H-NMR measurement.

The degree of saponification of the vinyl ester component in EVOH is not particularly limited as long as the gas barrier properties of EVOH, as its characteristics, are not affected.

Incidentally, EVOH may further contain structural units derived from the following co-monomers. As the co-monomers, α-olefins such as propylene, isobutene, vinyl acetate, α-octene, α-dodecene, and α-octadecene, hydroxy group-containing α-olefins such as 3-buten-1-ol, 4-penten-1-ol, and 3-butene-1,2-diol, as well as their esterified products, acylated products, and like hydroxy group-containing α-olefin derivatives, unsaturated carboxylic acids and their salts, partial alkyl esters, complete alkyl esters, nitriles, amides, and anhydrides, unsaturated sulfonic acids and their salts, vinylsilane compounds, vinyl chloride, styrene, and like co-monomers can be mentioned. Further, it may also be an EVOH-based resin that has undergone "post-modification" such as urethanization, acetalization, cyanoethylation, or oxyalkylenation.

The EVOH extraction method of the invention is a method for extracting EVOH, which includes applying the EVOH extractant of the invention to an EVOH layer-containing multilayer resin molded body. For example, the method preferably includes immersing an EVOH layer-containing multilayer resin molded body in the above EVOH extractant solution to extract EVOH.

The form of the EVOH layer-containing multilayer resin molded body to be immersed can be arbitrarily set. The molded body may be immersed as it is, or may also be suitably crushed or pulverized, for example, into small pieces, granules, or the like and then immersed.

The temperature of the solution at the time of EVOH extraction may be room temperature, but is preferably 60 to 100° C. In addition, extraction may also be performed using an autoclave or the like.

It is preferable that at the time of EVOH extraction, the solution in which the EVOH layer-containing multilayer resin molded body is immersed is subjected to stirring, shaking, or the like.

As a result of using the EVOH extractant of the invention, only EVOH in the multilayer resin molded body can be selectively dissolved to extract EVOH.

Next, the EVOH recovery method of the invention is an EVOH recovery method including a step of adding water and/or a lower alcohol to a solution containing EVOH that has been extracted by the above EVOH extraction method to deposit EVOH, followed by filtration or centrifugation.

It is preferable that the addition of water and/or a lower alcohol is followed by stirring, shaking, or the like.

Specifically, for example, after EVOH is extracted as described above, any undissolved resin and the like are removed by filtering the aqueous solution, etc., to obtain a solution containing the extracted EVOH. Next, water and/or a lower alcohol is added as a poor solvent to the solution containing the extracted EVOH, and then the solution is allowed to stand, followed by cooling or the like if necessary, to deposit EVOH.

Subsequently, EVOH is separated from the solution by filtration, centrifugation, or the like, and EVOH is recovered.

The filtration, centrifugation, or the like may be performed using a general apparatus according to a general method, and the conditions therefor may also be suitably set.

Further, the recovered EVOH may be dried using a dryer or the like.

The above water and/or lower alcohol acts as a poor solvent when depositing the dissolved EVOH.

As the lower alcohol, ethanol, isopropanol, butanol, and the like can be mentioned.

It is preferable that water and/or a lower alcohol is added such that the proportion of the water and/or lower alcohol is 50 to 95 mass % in the solution containing the extracted EVOH.

When the proportion is within such a range, the dissolved EVOH can be deposited well.

EVOH recovered as described above has a high purity, and can serve as a regenerated resin and be used again as a raw material for multilayer resin molded bodies.

Further, the method for regenerating an EVOH extractant of the invention is an EVOH extractant regeneration method including a step of removing water and/or a lower alcohol by distillation from a liquid left after the recovery of EVOH.

The distillation may be performed using a general apparatus according to a general method, and the conditions therefor may also be suitably set.

In the distillation step, even when the polar solvent in the EVOH extractant has a boiling point equal to or lower than the boiling point of water, its removal is sometimes difficult due to the presence of a quaternary ammonium salt. Thus, in the distillation step, such a polar solvent remains to some extent, and water is removed.

In addition, the method may also include a step of adding a polar solvent and/or water to a residue obtained in the distillation step. That is, a polar solvent and/or water is added to the residue obtained by distillation, and each mixing proportion is adjusted. As a result, the residue can be used as an EVOH extractant for the extraction of EVOH.

In this way, according to the invention, EVOH or an EVOH extractant can be regenerated and reused, and this can help to protect the global environment, etc.

EXAMPLES

Hereinafter, the invention will be described in detail based on the examples. Incidentally, the invention is not limited to the following examples. Unless otherwise specified, "parts" and "%" in the examples mean "parts by mass" and "mass %".

Example 1

An EVOH extractant aqueous solution containing 70 mass % of N-methyl-2-pyrrolidone (NMP), 7.5 mass % of dimethyl bis(2-hydroxyethyl)ammonium hydroxide (manufactured by Yokkaichi Chemical Co., Ltd., AH212-CS (product name), pH of 1 mass % aqueous solution: 12.3) as a quaternary ammonium salt, and 22.5 mass % of water was prepared. According to the following methods, an EVOH film solubility test and a test for EVOH extraction from a laminate film having an intermediate layer containing EVOH were performed.

(EVOH Film Solubility Test)

(1) An EVOH film (ethylene content: 32 mol %) cut into a 1-cm square was placed in 10 g of an EVOH extractant aqueous solution.

(2) The EVOH extractant aqueous solution of (1) was heated to 80° C. and then maintained in that state for 5 to 10 minutes, and whether the EVOH film dissolved was checked.

(3) Judgment was made according to the following criteria.

<Judgement Criteria>

Excellent: Capable of dissolving EVOH within 5 minutes

Good: Capable of dissolving EVOH within 10 minutes

Fair: EVOH partially dissolves, but some remains undissolved

Poor: EVOH insoluble (Test for Extraction from Laminate Film)

(1) A laminate film (PP/EVOH/PP) cut into a 1-cm square was placed in 10 g of an EVOH extractant aqueous solution.

(2) The EVOH extractant aqueous solution of (1) was heated to 80° C. and then maintained in that state for 1 to 3 hours, and whether EVOH in the intermediate layer dissolved was checked.

(3) Judgment was made according to the following criteria.

<Judgement Criteria>

Excellent: Capable of dissolving EVOH within 1 hour

Good: Capable of dissolving EVOH within 3 hours

Fair: EVOH partially dissolves, but some remains undissolved

Poor: EVOH insoluble

The judgment results are shown in Table 1.

Examples 2 to 4

Each test was performed in the same manner as in Example 1, except that the composition of the aqueous solution of the EVOH extractant was as shown in Table 1.

The results are shown all together in Table 1.

Examples 5 to 8

Each test was performed in the same manner as in Example 1, except that the composition of the aqueous solution of the EVOH extractant was as shown in Table 2.

Incidentally, as nonionic surfactants, NOIGEN XL-80 (manufactured by DKS Co., Ltd., HLB: 13.8) (ether type) and polyoxyethylene sorbitan monostearate (manufactured by DKS Co., Ltd., SORGEN TW-60, HLB: 14.9) (ester type) were used.

The results are shown all together in Table 2.

Examples 9 to 11

Each test was performed in the same manner as in Example 1, except that the composition of the aqueous solution of the EVOH extractant was as shown in Table 3.

The results are shown all together in Table 3.

Comparative Examples 1 to 8

Each test was performed in the same manner as in Example 1, except that the composition of the aqueous solution of the EVOH extractant was as shown in Table 4 and Table 5.

The results are shown all together in Table 4 and Table 5.

TABLE 1

(mass %)

| | Example 1 | Example 2 | Example 3 | Example 4 |
|---|---|---|---|---|
| NMP | 70 | 90 | 60 | 52.5 |
| Quaternary ammonium salt | 7.5 | 5 | 7.5 | 7.5 |
| Water | 22.5 | 5 | 32.5 | 40 |
| Solubility of EVOH film | Excellent | Excellent | Excellent | Excellent |
| Solubility of EVOH in laminate film | Excellent | Excellent | Excellent | Good |

TABLE 2

(mass %)

| | Example 5 | Example 6 | Example 7 | Example 8 |
|---|---|---|---|---|
| NMP | 69 | 69 | | |
| Isopropanol | | | 70 | |
| Diethylene glycol monobutyl ether | | | | 70 |
| Quaternary ammonium salt | 7.5 | 7.5 | 7.5 | 7.5 |
| Water | 22.5 | 22.5 | 22.5 | 22.5 |
| Nonionic surfactant (ether type) | 1 | | | |
| Nonionic surfactant (ester type) | | 1 | | |
| Solubility of EVOH film | Excellent | Excellent | Excellent | Excellent |
| Solubility of EVOH in laminate film | Excellent | Excellent | Excellent | Excellent |

TABLE 3

| | Example 9 | Example 10 | (mass %) Example 11 |
|---|---|---|---|
| NMP | 28 | 28 | 28 |
| Phenyl glycol | 47 | 46 | 46 |
| Quaternary ammonium salt | 7 | 7 | 7 |
| Water | 18 | 18 | 18 |
| Nonionic surfactant (ether type) | | 1 | |
| Nonionic surfactant (ester type) | | | 1 |
| Solubility of EVOH film | Excellent | Excellent | Excellent |
| Solubility of EVOH in laminate film | Excellent | Excellent | Excellent |

TABLE 4

| | Comparative Example 1 | Comparative Example 2 | Comparative Example 3 | (mass %) Comparative Example 4 |
|---|---|---|---|---|
| Isopropanol | | | 100 | |
| Diethylene glycol monobutyl ether | | | | 100 |
| Ethanol | 70 | | | |
| Sodium hydroxide | | 3 | | |
| Water | 30 | 97 | | |
| Solubility of EVOH film | Excellent | Poor | Poor | Poor |
| Solubility of EVOH in laminate film | Fair to Poor | Poor | Poor | Poor |

TABLE 5

| | Comparative Example 5 | Comparative Example 6 | Comparative Example 7 | (mass %) Comparative Example 8 |
|---|---|---|---|---|
| NMP | 100 | | | |
| n-Hexane (SP value: 7.3) | | | 70 | |
| Ethylene glycol (SP value: 14.6) | | | | 70 |
| Quaternary ammonium salt | | 7.5 | 7.5 | 7.5 |
| Water | | 92.5 | 22.5 | 22.5 |
| Solubility of EVOH film | Excellent | Poor | Poor | Good |
| Solubility of EVOH in laminate film | Fair to Poor | Poor | Poor | Poor |

The results in Tables 1 to 5 show that the EVOH extractant aqueous solutions of the examples were excellent in both the solubility of an EVOH film and the solubility of EVOH in a laminate film.

Meanwhile, none of the comparative example solutions provided satisfactory EVOH solubility. In particular, the aqueous solution of Comparative Example 7 was incapable of being uniformly mixed, and also EVOH was insoluble.

Example 12

(Recovery of EVOH)

Using the EVOH film-dissolved solution obtained in the EVOH film solubility test of Example 1, 45 g of water was added as a poor solvent to 5 g of this solution and mixed, and then the mixed solution was allowed to stand for 90 minutes to deposit and precipitate EVOH.

Next, the EVOH-precipitated solution was filtered to remove the solution. The resulting EVOH was recovered by suction filtration and dried. The EVOH recovery rate was 99%.

Example 13

(Regeneration of EVOH Extractant)

Using the liquid left after filtration in Example 12, the poor solvent was removed from this liquid by distillation to give 3.5 g of a residue.

In order to confirm that the obtained residue contained NMP and a quaternary ammonium salt, 1.1 g of water was added to the obtained residue to prepare an EVOH extractant solution, and, using a 1-cm square multilayer film (ONY/EVOH/ONY) (ONY: oriented nylon film), an EVOH extraction test was performed according to the method of Example 1. As a result, it was confirmed that EVOH in the multilayer film dissolved, and both ONY films detached. From the fact that EVOH was extracted by the solution using the residue obtained above, it was confirmed that the EVOH extractant had been regenerated.

INDUSTRIAL APPLICABILITY

According to the invention, EVOH or an EVOH extractant can be regenerated and reused, and this helps to protect the global environment, etc.

The invention claimed is:

1. An EVOH extraction method, comprising:

contacting an EVOH layer-containing multilayer resin molded body with an EVOH extractant;

wherein EVOH is present as a layer between layers in the multilayer resin molded body; and wherein the EVOH extractant comprises a polar solvent having an SP value of 9 to 13 and a quaternary ammonium salt;

to extract EVOH from between the layers of the multilayer resin molded body.

2. The EVOH extraction method according to claim 1, comprising a step of immersing the EVOH layer-containing multilayer resin molded body in a solution of the EVOH extractant to extract EVOH.

3. An EVOH recovery method comprising a step of mixing a solution containing EVOH that has been extracted by the EVOH extraction method according to claim 1 with water and/or a lower alcohol to deposit EVOH, followed by filtration or centrifugation.

4. An EVOH extractant regeneration method comprising a step of removing water and/or a lower alcohol by distillation from a liquid left after the recovery of EVOH by the EVOH recovery method according to claim 3.

5. The EVOH extractant regeneration method according to claim 4, further comprising a step of adding a polar solvent and/or water to a residue obtained in the step of claim 4.

* * * * *